US006999798B2

(12) United States Patent
Seo

(10) Patent No.: US 6,999,798 B2
(45) Date of Patent: Feb. 14, 2006

(54) SYSTEM AND METHOD FOR MAKING NOTIFICATION OF RECEPTION LIMITATION STATUS OF MOBILE TELEPHONE

(75) Inventor: Sang-Uk Seo, Taegukwangyok-shi (KR)

(73) Assignee: Samsung Electronics Co. Ltd., Suwon-si (KR)

(*) Notice: Subject to any disclaimer, the term of this patent is extended or adjusted under 35 U.S.C. 154(b) by 202 days.

(21) Appl. No.: 10/634,745

(22) Filed: Aug. 6, 2003

(65) Prior Publication Data

US 2004/0029571 A1 Feb. 12, 2004

(30) Foreign Application Priority Data

Aug. 9, 2002 (KR) ............... 10-2002-0047172

(51) Int. Cl.
*H04Q 7/20* (2006.01)
(52) U.S. Cl. ............ 455/567; 455/552.1; 455/413
(58) Field of Classification Search ........... 455/567, 455/565, 412.2, 413, 417, 459, 462, 465, 455/552.1, 517; 370/365; 379/201.01, 202.01
See application file for complete search history.

(56) References Cited

U.S. PATENT DOCUMENTS

| 5,881,060 A * | 3/1999 | Morrow et al. ............. 370/337 |
| 6,408,177 B1 * | 6/2002 | Parikh et al. ............ 455/414.4 |
| 6,418,306 B1 * | 7/2002 | McConnell ................. 455/413 |
| 6,553,222 B1 * | 4/2003 | Weiss ......................... 455/567 |
| 6,671,508 B1 * | 12/2003 | Mitsuoka et al. ......... 455/412.1 |
| 6,826,397 B1 * | 11/2004 | Vasa ........................... 455/417 |
| 6,882,838 B1 * | 4/2005 | Lee et al. ................. 455/414.1 |
| 2002/0028684 A1 * | 3/2002 | Kuwahra et al. ........... 455/456 |
| 2003/0211862 A1 * | 11/2003 | Hutchison et al. ....... 455/552.1 |
| 2004/0157606 A1 * | 8/2004 | Lee .......................... 455/435.1 |

* cited by examiner

*Primary Examiner*—Joseph Feild
*Assistant Examiner*—Kamran Afshar
(74) *Attorney, Agent, or Firm*—Roylance, Abrams, Berdo & Goodman L.L.P.

(57) ABSTRACT

A system and method for providing notification of a reception limitation status of a receiving mobile telephone. The system and method employ the operations of electing a reception limitation reason after setting up reception limitation mode of operation for the receiving mobile terminal, converting the mobile terminal from a current mode of operation to a reception limitation mode of operation, determining whether the reception limitation has been set up for the receiving mobile terminal when a voice call is generated, providing bits corresponding to the reception limitation reason of the receiving mobile terminal based on an order qualification code (ORDQ) field of a release order, transmitting the bits corresponding to the reception limitation reason from the receiving mobile terminal to the base station when the reception limitation mode of operation has been established for the receiving terminal, transmitting the received bits in the ORDQ field of the release order to a calling mobile terminal from the base station, providing notification at the calling mobile terminal of the reception limitation reason corresponding to the received ORDQ bit value from the base station.

16 Claims, 4 Drawing Sheets

SYSTEM AND METHOD FOR MAKING NOTIFICATION OF RECEPTION LIMITATION STATUS OF MOBILE TELEPHONE

PRIORITY

This application claims priority under 35 U.S.C. § 119 to an application entitled "METHOD FOR MAKING NOTIFICATION OF RECEPTION LIMITATION STATUS OF MOBILE TELEPHONE" filed in the Korean Industrial Property Office on Aug. 9, 2002 and assigned Serial No. 2002-47172, the contents of which are incorporated herein by reference.

BACKGROUND OF THE INVENTION

1. Field of the Invention

The present invention relates to a system and method for notifying a first mobile telephone of a reception limitation status of a second mobile telephone, and more particularly, to a system and method for notifying a caller of a reception limitation status of a called party when the called party's phone is a reception limitation mode.

2. Description of the Related Art

Generally, if a voice call is generated after a receiver of a called party has entered a reception limitation mode in a mobile telephone, the receiving mobile telephone does not ring or provide an indication of an incoming call or message. Therefore, a caller just hears a ringing tone or the call is routed to a voice mail of the called party, e.g., an automatic response message. As a result, the caller fails to connect with the called party without realizing the failure is based on the reception limitation of the receiver of the called party. In addition, the receiver mobile telephone cannot set up a reception limitation that is suitable for various environments. For example, a calling party may not know whether the called party does not respond because it is out of calling range, or because the called party simply powered off the ringer on their mobile telephone. Accordingly, when the receiver mobile terminal sets up the reception limitation function, the caller only hears a tone or automatic response message without knowing the specific reason for not being able to reach the called party.

FIG. 1 is a transmission diagram illustrating an example of a technique for providing a reception limitation setup for a conventional mobile telephone. Referring to FIG. 1, when a caller generates a voice call, if a receiver has set up the reception limitation function in the mobile telephone, the receiver mobile telephone 400 is silent. Therefore, the caller hears the tone for a predetermined time and then is connected to the called party's voice mailbox. When a base station 500 sets up '00000000' in an order qualification code (ORDQ) field of a release order and transmits it to the receiver mobile telephone 400, the receiver mobile telephone 400 sets up '00000000' in the ORDQ field of the release order and transmits it to the base station as a response. When the base station 500 sets up '00000000' in the ORDQ field of the release order and transmits it to the caller mobile telephone 600 of the caller who finishes recording voice in the voice mail box, the calling mobile telephone sets up '00000000' in the ORDQ field of the release order and transmits it to the base station as a response.

The currently used release order has three ORDQ fields as shown in Table 1.

TABLE 1

| Items | Uses | Used channels |
|---|---|---|
| 00000000 | Release order | FTC (no reason given), RTC (normal release) |
| 00000001 | Release order (with power down indication) | RTC |
| 00000010 | Release order (indicates that requested service option has been rejected) | FTC |

SUMMARY OF THE INVENTION

Therefore, it is an object of the present invention to provide a system and method for notifying a caller of a reception limitation status of a receiver mobile telephone to indicate that the receiver mobile telephone is capable of providing a reception limitation notification.

These and other objects of the present invention can be substantially accomplished by a system and method for providing notification of a reception limitation status of a receiver mobile telephone. The system and method employ the operations of selecting a reception limitation reason after setting up reception limitation; converting the receiving mobile terminal from a current mode of operation to a reception limitation mode of operation; determining whether the reception limitation has been established for the receiving mobile terminal when a voice call is generated; providing bits corresponding to the reception limitation reason of the receiving mobile terminal based on an order qualification code (ORDQ) field of a release order, transmitting the bits corresponding to the reception limitation reason from the receiving mobile terminal to the base station, when the reception limitation mode of operation has been established for the receiving terminal; transmitting the received bits in the ORDQ field of the release order to a calling mobile terminal from the base station; and providing notification at the calling terminal of the reception limitation reason corresponding to the ORDQ bit value received from the base station.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Several embodiments of the present invention will now be described in detail with reference to the accompanying drawings. Hereinafter, a method for making notification of a reception limitation status of a mobile telephone according to an embodiment of the present invention will be described with reference to the accompanying drawings. Also, a detailed description of known functions and configurations have been omitted for conciseness.

Figure 1:
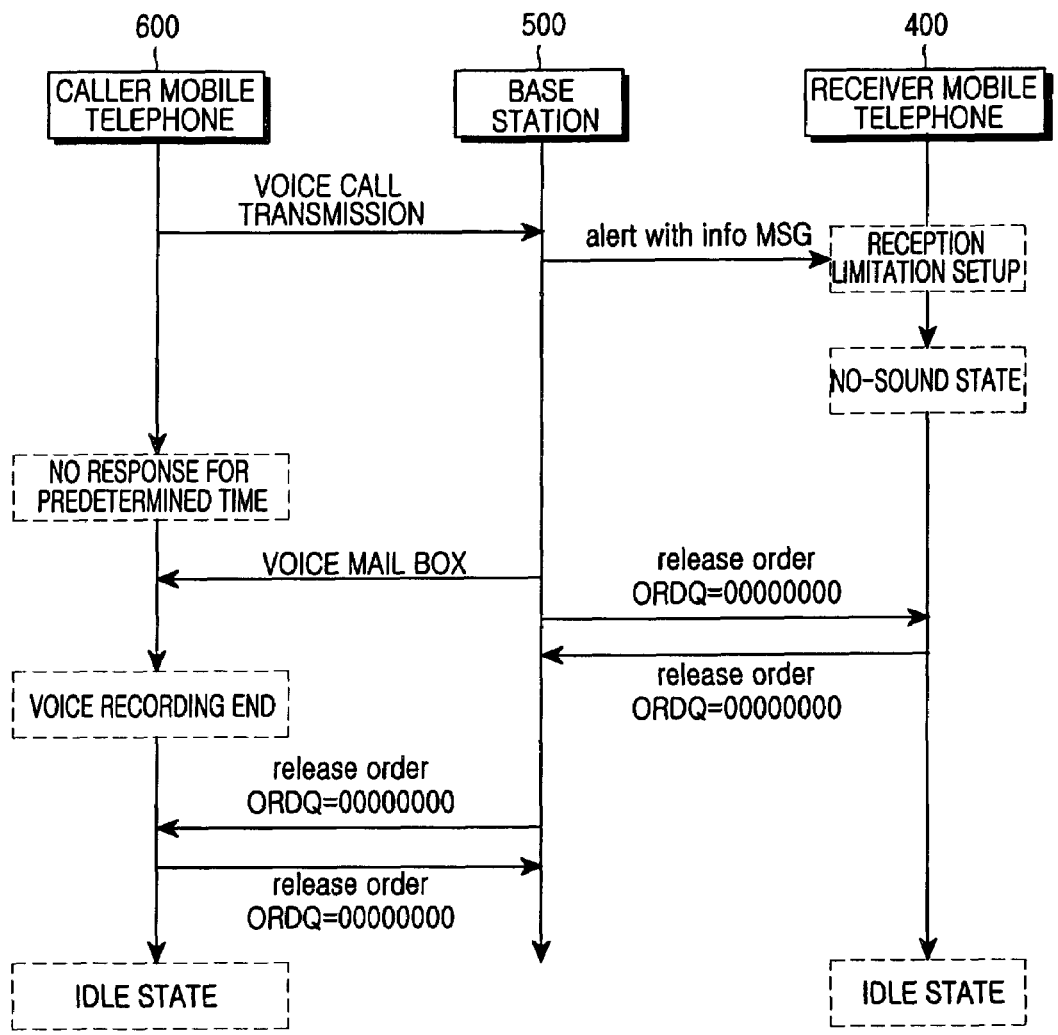
FIG. 1 is a transmission diagram illustrating an example of a technique for providing reception limitation setup for a conventional mobile telephone.
Figure 2:
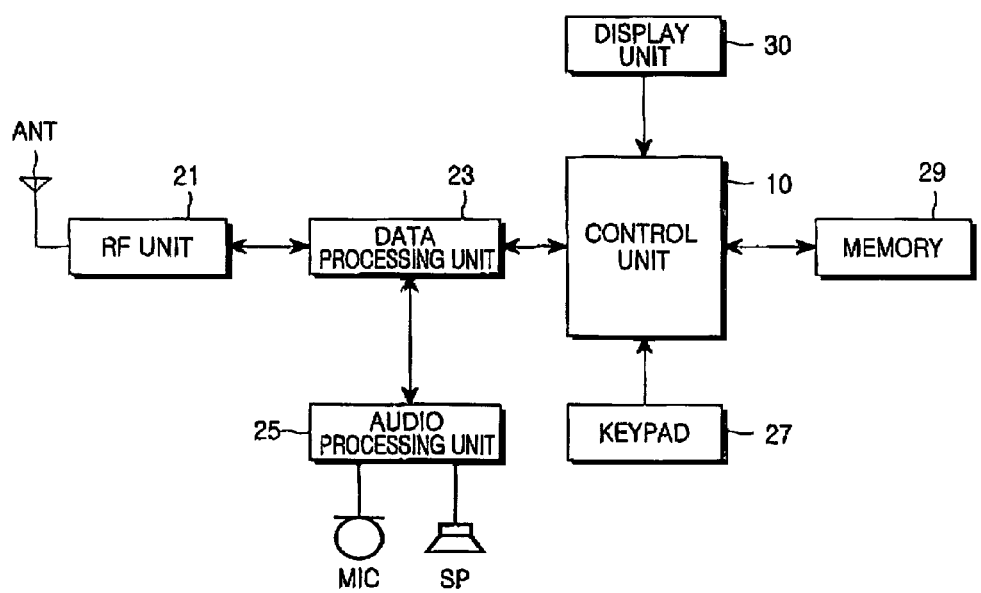
FIG. 2 is a block diagram illustrating an example of components of a mobile telephone in accordance with an embodiment of the present invention.

FIG. 2 is a block diagram illustrating an example of components of a mobile telephone in accordance with an embodiment of the present invention. Specifically, the mobile telephone shown in FIG. 2 comprises a control unit 10, a radio frequency (RF) unit 21, a data processing unit 23, an audio processing unit 25, a key pad 27, a memory 29, a display unit 30, a speaker SP, a microphone MIC, and an antenna ANT. The RF unit 21 performs communication for the mobile telephone. The RF unit 21 includes a RF transmitter (not shown) for increasing and amplifying a frequency of a transmitted signal, and a RF receiver (not shown) for low-noise amplifying a received signal and decreasing a frequency. The data processing unit 23 includes a transmitter (not shown) for encoding and modulating the transmitted signal, and a receiver (not shown) for demodulating and decoding the received signal. That is, the data processing unit 23 can be composed of a modem and a coder/decoder (codec).

In one embodiment of the invention, the audio-processing unit 25 processes the received audio signal from the data processing unit 23. In another embodiment of the invention, the audio-processing unit transmits the transmitted audio signal from the MIC to the data processing unit 23. The keypad 27 includes keys for inputting number and character information and function keys for setting up various functions.

The memory 29 can be composed of a program memory and a data memory. The program memory has programs for controlling the general operation of the mobile telephone. In accordance with an embodiment of the present invention, reception limitation reasons of the mobile telephone user are at least $2^8$–3 and respectively set up as 8 bits. Characters, automatic response messages recorded by the mobile telephone user and melodies edited by the mobile telephone user are connected to the respective reception limitation reasons and stored in a database DB. The data memory temporarily stores data generated while the programs are executed.

The control unit 10 controls the operation of the mobile telephone, and can include the data processing unit 23. In accordance with an embodiment of the present invention, if a voice call is generated during the reception limitation mode of operation for the receiver mobile telephone, the control unit 10 establishes bits corresponding to the reception limitation reason with respect to an order qualification code (ORDQ) field of a release order. The control unit 10 then transmits via a base station the bits in the ORDQ field to a calling mobile telephone.

The display unit 30 displays messages generated while the programs are executed under the control of the control unit 10, and it also displays key operation states of the user while a call function is executed.

An example of the operation of the mobile telephone will now be explained with reference to FIG. 2. When the user enters a calling mode for the calling mobile telephone after performing a dialing operation via the key pad 27, the control unit 10 detects the calling mode, processes dial information received through the data processing unit 23, converts the processed information into an RF signal via the RF unit 21, and outputs the RF signal. Thereafter, when a receiver mobile telephone generates a response signal, the control unit 10 detects the response signal via the RF unit 21 and the data processing unit 23. A call path is established via the audio processing unit 25 allowing, the user to perform a call function. In a reception or receiving mode, the control unit 10 detects the reception mode of operation via the data processing unit 23. In response, the control unit 10 generates a ring signal via the audio-processing unit 25. When the user responds, for example, answers the call, the control unit 10 detects the user's response. A call path is then established via the audio-processing unit 25 to allow the user to talk to the calling party. It will be appreciated by those skilled in the art that although voice communication was given as an example for the calling and reception modes, a data communication function using packet data or image data can also be performed without departing from the scope of the invention. In a standby mode or character communication mode of operation, the control unit 10 displays character data processed via the data processing unit 23 on the display unit 30.

The procedure for providing notification of the reception limitation status of the receiver mobile telephone will now be explained. When the receiver mobile telephone user selects a reception limitation reason after selecting the reception limitation mode of operation from a menu, the receiver mobile telephone operates in the reception limitation mode. When the voice call is generated, the control unit 10 transmits the ORDQ bit value to the base station via a release order corresponding to the reception limitation reason selected by the receiver mobile telephone user. The base station then transmits an ORDQ confirmation bit value to the receiver mobile telephone via the release order as a response. The base station also transmits the ORDQ bit value from the receiver mobile telephone to a calling mobile telephone via the release order. The calling mobile telephone transmits the ORDQ confirmation bit value as a response to the base station via the release order, and notifies the base station of the reception limitation reason corresponding to the ORDQ bit value that was transmitted from the base station to calling mobile telephone. The calling mobile telephone then alerts its user in the form of characters, automatic response messages or melodies.

Figure 3:
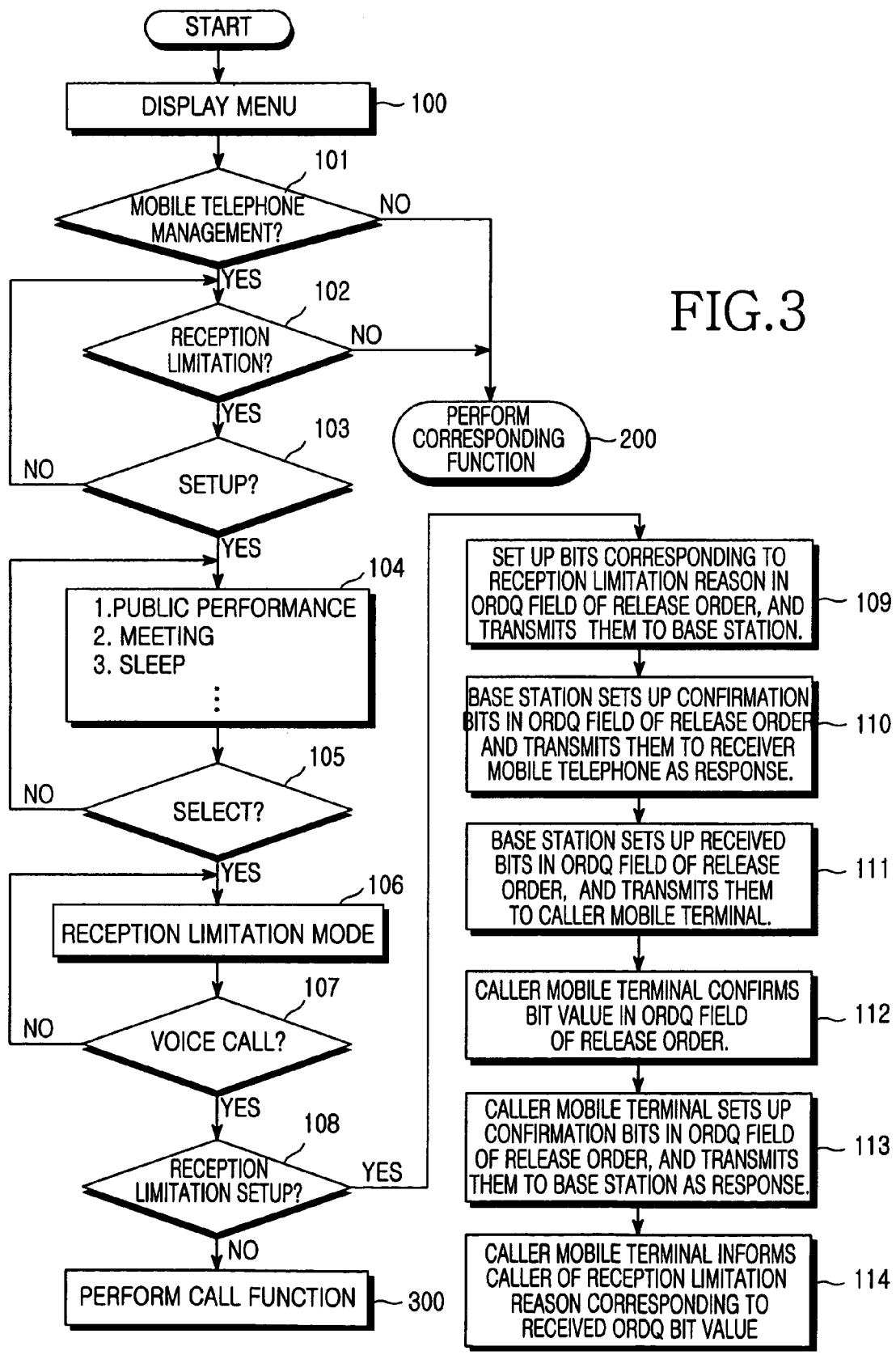
FIG. 3 is a flowchart showing an example of steps for providing notification of a reception limitation status of the mobile telephone in accordance with an embodiment of the present invention.
Figure 4:
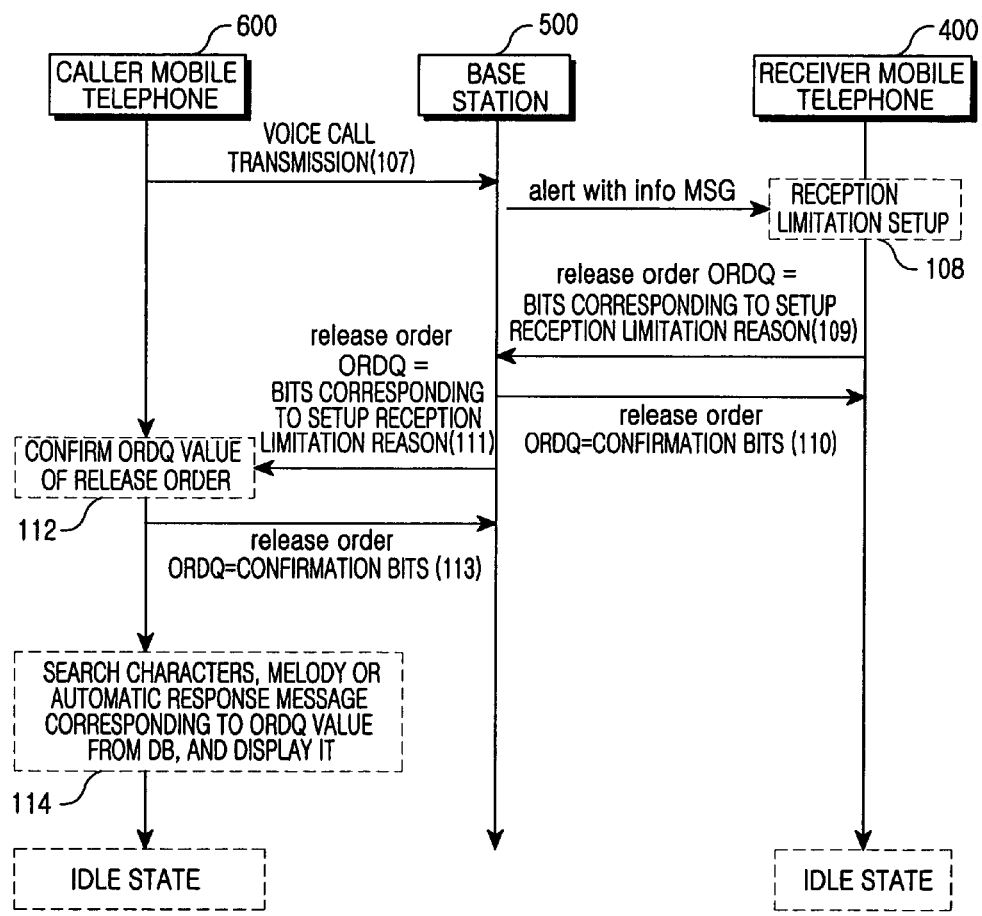
FIG. 4 is a transmission diagram illustrating an example of operations for providing notification of the reception limitation status of the mobile telephone in accordance with an embodiment of the present invention.

FIG. 3 is a flowchart showing an example of steps for providing notification of the reception limitation status of a mobile telephone in accordance with an embodiment of the present invention. FIG. 4 is a transmission diagram illustrating an example of providing notification of the reception limitation status of the mobile telephone in accordance with an embodiment of the present invention.

An embodiment of the present invention will now be explained in detail in conjunction with FIGS. 2 and 3 and.

When the user of the mobile telephone 400 presses a menu key of the keypad 27, the control unit 10 detects the condition and controls the display unit 30 to display a menu in step 100. While the menu is displayed, if the user of the mobile telephone 400 selects a mobile telephone management option via the keypad 27, the control unit 10 detects the selection in step 101 and displays items representing the mobile telephone management. When the user of the mobile telephone 400 selects reception limitation from among the items of the mobile telephone management menu, the control unit 10 detects the selection in step 102 and controls the display unit 30 to display menu items regarding the reception limitation. When the user of the mobile telephone 400 selects a setup option which is among the items of the reception limitation, the control unit 10 detects the selection in step 103 and displays options listing reasons for reception limitation on the display unit 30 in step 104. In step 104, at least $2^8-3$ reception limitation reasons are displayed on the display unit 30. The reasons are respectively set up as 8 bits and stored in the database DB. In addition, the reception limitation reasons are associated with characters, automatic response messages recorded by the user of the mobile telephone 400, and melodies edited by the user of the mobile telephone 400. Table 2 lists an example of an 8 bit-numbering scheme listing a sample of reasons for reception limitation.

TABLE 2

| | |
|---|---|
| 00001000 | reception rejection |
| 00010000 | public performance |
| 00100000 | meeting |
| 01000000 | sleep |
| 11111111 | ORDQ confirm |
| .. | |
| . | |
| . | |

When the user of the receiver mobile telephone 400 selects the reception limitation reason suitable for their reception limitation status, the control unit 10 detects the selection in step 105, proceeds to step 106 and converts the receiver mobile telephone operation from a receiving mode of the receiver mobile telephone 400 into a reception limitation mode.

When a voice call is generated, the control unit 10 detects the voice call in step 107 and confirms whether the mobile telephone 400 is set up for the reception limitation mode. When the receiver mobile telephone 400 is set up for the reception limitation mode, the control unit 10 detects this state of operation in step 108 and proceeds to step 109. If the receiver mobile telephone 400 is not set up in the reception limitation mode, the control unit 10 detects this state of operation in step 108 and proceeds to step 300 and performs a call function with the user of the receiver mobile telephone 400, thus enabling the user of the receiver mobile telephone 400 to communicate with the user of the caller mobile telephone 600.

However, if in step 109 the control unit 10 detects that the receiver mobile telephone 400 is set up in the reception limitation mode based on the bits corresponding to the reception limitation reason selected by the user of the mobile telephone 400 in step 105 in the ORDQ field of the release order, the control unit 10 transmits the bits to the base station 500. In step 110, the base station 500 sets up the confirmation bit value in the ORDQ field of the release order and transmits it to the receiver mobile telephone 400 as a response. In step 111, the base station sets up the bits received from the receiver mobile telephone 400 in step 109 in the ORDQ field of the release order and transmits it to the calling mobile telephone 600. In step 112, a control unit 10 of the calling mobile telephone 600 confirms the receipt of the ORDQ bit value from the base station 500. In step 113, the control unit 10 of the caller mobile telephone 600 sets up the confirmation bit value in the ORDQ field of the release order and transmits it to the base station 500 as a response.

In step 114, the control unit of the caller mobile telephone 600 searches the reception limitation reason corresponding to the ORDQ bit value received from the base station 500 in step 111 from a database DB of the calling mobile telephone 600. At least $2^8-3$ reception limitation reasons are respectively set up as 8 bits and stored in the database DB of the caller mobile telephone 600. In addition, the reception limitation reasons are also associated with characters, automatic response messages and melodies.

As a result, the control unit 10 of the caller mobile telephone 600 searches the reception limitation reason corresponding to the received ORDQ bit value from the database DB of the caller mobile telephone 600, and notifies the user of the caller mobile telephone 600 of the reception limitation reason of the receiver mobile telephone 400 in the form of characters, automatic response messages or melodies.

As discussed earlier, in accordance with an embodiment of the present invention, the specific reception limitation status of the mobile telephone user is set up in the mobile telephone, so that the caller can be informed of the reception limitation status of the mobile telephone user. Accordingly, the mobile telephone user does not have to make an explanation why he or she cannot answer the phone, thereby allowing smooth communication.

While the invention has been shown and described with reference to certain embodiments, it will be understood by those skilled in the art that various changes in form and details may be made therein without departing from the spirit and scope of the invention as defined by the appended claims.

What is claimed is:

1. A method for providing notification of a reception limitation status of a receiving mobile terminal, comprising:
   selecting a reception limitation reason after selecting a reception limitation mode of operation for said receiving mobile terminal;
   converting said receiving mobile terminal from a current mode of operation to a reception limitation mode of operation;
   determining whether the reception limitation mode of operation has been set up for said receiving mobile terminal when a voice call is detected;
   providing bits corresponding to the reception limitation reason of said receiving mobile terminal based on an order qualification code (ORDQ) field of a release order;
   transmitting the bits corresponding to the reception limitation reason from said receiving mobile terminal to a base station when the reception limitation mode of operation has been set-up for said receiving mobile terminal;
   transmitting the received bits in the ORDQ field of the release order and from said base station to a calling mobile terminal; and
   providing notification at said calling mobile terminal of the reception limitation reason corresponding to the ORDQ bit value from said base station.

2. The method as claimed in claim 1, wherein at least $2^8-3$ reception limitation reasons are stored in the receiver mobile terminal and the calling mobile terminal.

3. The method as claimed in claim 2, wherein the reception limitation reasons comprise an 8-bit address.

4. The method as claimed in claim 1, further comprising: notifying a caller at the calling mobile terminal of the reception limitation reason corresponding to the ORDQ bit value in a form of at least one of characters, automatic response messages recorded by the receiving mobile terminal, and melodies provided by the receiving mobile terminal.

5. The method as claimed in claim 1, further comprising the steps of setting, at the base station, confirmation bits in the ORDQ field of the release order in response to reception of the ORDQ bit value from the receiving mobile terminal.

6. The method as claimed in claim 5, further comprising the steps of and transmitting said confirmation bits to the receiving mobile terminal.

7. The method as claimed in claim 1, further comprising the step of setting, at the calling mobile terminal, confirmation bits in the ORDQ field of the release order in response to reception of the ORDQ bit value from the base station., and transmitting them to the base station.

8. The method as claimed in claim 7, further comprising the step of transmitting the confirmation bits in the ORDQ field to the receiving mobile terminal.

9. A system for providing notification of a reception limitation status of a mobile terminal, said system comprising:
- a calling mobile terminal, a base station and a receiving mobile terminal; said receiving mobile terminal being adapted to
- select a reception limitation reason after selecting a reception limitation mode of operation at said receiving mobile terminal,
- convert from a current mode of operation to a reception limitation mode of operation,
- determine whether the reception limitation mode of operation has been set up for said receiving mobile terminal when a voice call is detected,
- provide bits corresponding to the reception limitation reason of said receiving mobile terminal based on an order qualification code (ORDQ) field of a release order, and
- transmit the bits corresponding to the reception limitation reason to said base station when the reception limitation mode of operation has been set up for said receiving mobile terminal;

said base station being adapted to transmit the received bits in the ORDQ field of the release order to said calling mobile terminal; and said calling terminal being adapted to provide notification of the reception limitation reason corresponding to the received ORDQ bit value.

10. The system of claim 9, wherein said receiving and calling mobile terminals are adapted to store at least $2^8-3$ reception limitation reasons.

11. The system of claim 10, wherein said reception limitation reasons are comprise an 8-bit address.

12. The system of claim 9, wherein the calling mobile terminal is adapted to notify a caller of the reception limitation reason corresponding to the ORDQ bit value in a form of at least one of characters, automatic response messages, and melodies.

13. The system of claim 9, wherein the base station is adapted to provide confirmation bits in the ORDQ field of the release order in response to reception of the ORDQ bit value from the receiving mobile terminal.

14. The system of claim 13, wherein the base station is adapted to transmit said confirmation bits to the receiving mobile terminal.

15. The system of claim 9, wherein calling mobile terminal is adapted to provide confirmation bits in the ORDQ field of the release order in response to reception of the ORDQ bit value from the base station.

16. The system of claim 15, wherein the calling mobile terminal is adapted to transmit the confirmation bits in the ORDQ field to the receiving mobile terminal.

* * * * *